United States Patent [19]

Spencer et al.

[11] 4,048,837

[45] Sept. 20, 1977

[54] CHOKER STRAIGHTENER

[76] Inventors: Clark V. Spencer, 817 NW. A St.;
Benjamin G. Rondeau, 1170 NE.
10th, both of Grants Pass, Oreg.
97526

[21] Appl. No.: 713,050

[22] Filed: Aug. 9, 1976

[51] Int. Cl.$^2$ .............................................. B21D 7/06
[52] U.S. Cl. .................... 72/387; 72/453.01;
72/457
[58] Field of Search ................ 72/387, 389, 412, 415,
72/416, 457, 458, 453.01

[56] References Cited

U.S. PATENT DOCUMENTS

| 1,321,663 | 11/1919 | Osborne | 72/412 |
| 2,407,040 | 9/1946 | Taramaschi | 72/387 |
| 3,511,074 | 5/1970 | Crees | 72/389 |
| 3,842,651 | 10/1974 | Shaffer | 72/416 |
| 3,848,450 | 11/1974 | Dehlbom | 72/389 |

Primary Examiner—C.W. Lanham
Assistant Examiner—Gene P. Crosby

[57] ABSTRACT

A straightener for bent and kinking wire rope, including log chokers and like cables, has a base member divided into a pair of mounting surfaces disposed at an acute angle with respect to one another. On one of the mounting surfaces of the base member is arranged two laterally spaced, longitudinally extending cable support members provided with opposed recesses for receiving a length of cable, with the bent portion of the cable being placed between the support members. A lever actuated by a power assembly mounted on the other of the mounting surfaces of the base member swings between the support members to straighten the bent portion of the cable, and the like.

9 Claims, 4 Drawing Figures

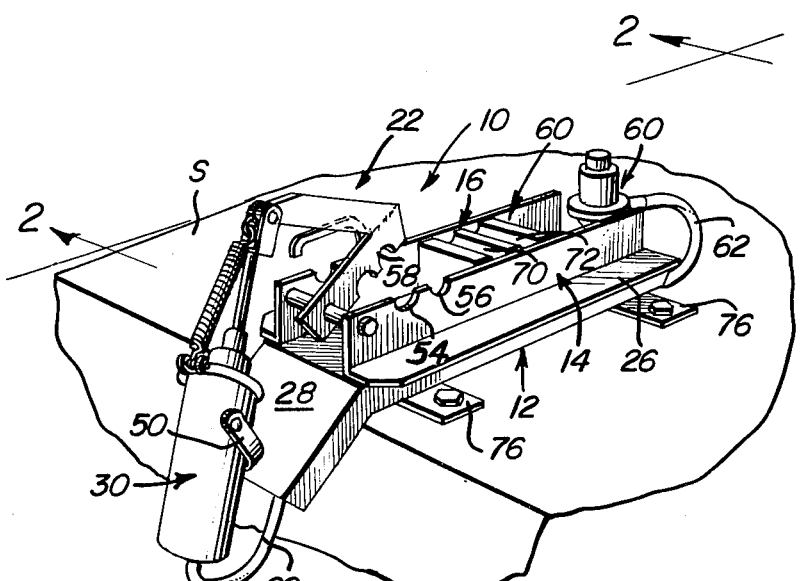
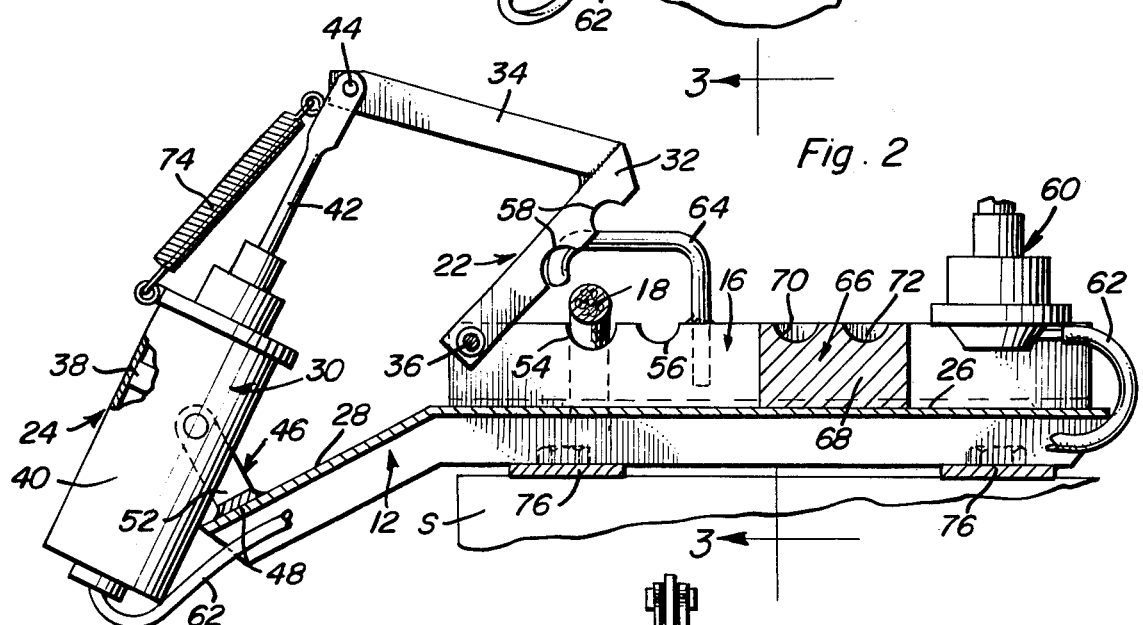
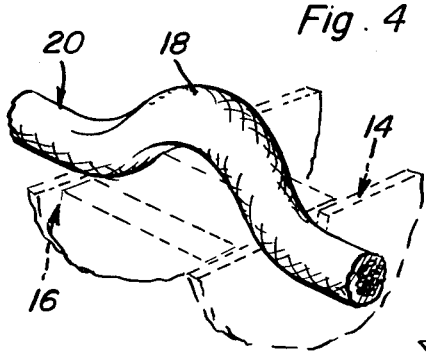
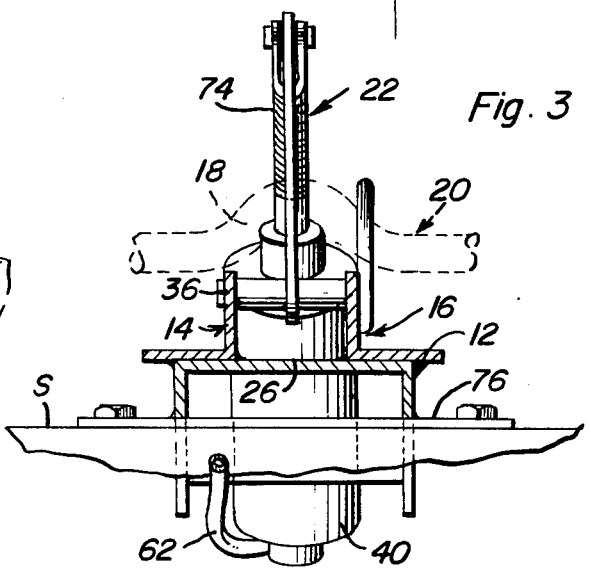

CHOKER STRAIGHTENER

BACKGROUND OF THE INVENTION

1. Field of the Invention

This invention relates generally to a device for straightening bent and kinking wire rope, and the like, and particularly to a device suitable for mounting on the bed of a log-hauling truck, and the like, straightening bent and kinking log chokers.

2. Description of the Prior Art

Logging operations conventionally employ wire ropes generally referred to as logging chokers and having a noose used for hauling logs and the like. These logging chokers may span from one-half to 1 inch in diameter and from 16 feet to 40 feet in length. A problem which arises with the use of these chokers, however, is that they tend to become bent and kinked, and workmen in the woods cannot conveniently straighten such bent and kinked portions at the logging site.

Various proposals have been made for devices which bend and/or straighten cable, pipe, and the like. Examples of such devices can be found in U.S. Pat. Nos. 1,054,132, issued Feb. 25, 1913 to H. A. Miner; 2,451,302, issued Oct. 12, 1948 to A. E. Peters; 3,511,074, issued May 12, 1970 to S. R. Crees; and 3,848,450, issued Nov. 19, 1974 to E. K. Dehlbon et al. A major disadvantage of these known devices as regards the straightening of bent and kinked logging chokers, and the like, in the field is that they tend to be heavy and rather complex, and accordingly expensive, of construction.

SUMMARY OF THE INVENTION

It is an object of the present invention to provide a wire rope straightening device which is light weight and can be kept in the field during logging operations, and the like.

It is another object of the present invention to provide a choker straightening device which will permit workmen in the woods to have straight chokers at all times.

It is yet another object of the present invention to provide a straightening device which can selectively be employed as a splicing vise for connecting together two lengths of wire rope, and the like.

These and other objects are achieved according to the present invention by providing a choker straightener having: a base member; two laterally spaced cable support members arranged on the base member for supporting a bent portion of cable between the support members; a lever arrangement pivotally mounted on the base member for movement toward and intermediate of the cable support members and selectively engaging a bent portion of cable intermediate the associated cable support members and straightening the bent portion; and a power assembly mounted on the base member and connected to the lever arrangement for moving the lever arrangement relative to the cable support members.

While the present invention is primarily intended for use with logging chokers, it is to be understood that the invention may be employed for straightening, or splicing, any cables.

According to an advantageous feature of the present invention, the base member includes a first mounting surface and a second mounting surface disposed at an acute angle with respect to the first mounting surface. The cable support members are mounted on the first mounting surface and the power assembly, including the linear fluid motor, is mounted on the second support surface. The lever arrangement extends longitudinally in a direction parallel to a longitudinal extent of the cable support members, and is mounted on the first mounting surface of the base member adjacent to and extending longitudinally away from the second mounting surface and is connected to the fluid motor of the power assembly for actuation thereby.

The lever arrangement is substantially in the form of a bell crank lever having a longer arm and a shorter arm extending at an acute angle from one another. The longer arm is pivotally mounted to the cable support members adjacent the second mounting surface for swinging movement parallel to the longitudinal extent of the cable support members, and the shorter arm of the lever is pivotally connected to the fluid motor such that the lever is swung around the pivot formed at the juncture of the two arms of the lever, and connected to the cable support members.

The power assembly also includes a graduating valve connected to a cylinder of the fluid motor for controlling displacement of the piston associated with the motor cylinder and permitting continuous control of the position of the lever relative to the cable support members.

The device also advantageously further includes an anvil slidably disposed between the cable support members for selectively converting the device from a straightener to a splicing vise. By sliding the anvil from a position corresponding with a cable straightening station of the cable support members and a position spaced from the straightening station, a change in function of the device can be easily and quickly accomplished.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view showing a cable straightening and splicing vise device according to the present invention disposed on a suitable supporting structure, such as the bed of a logging truck.

FIG. 2 is a fragmentary, enlarged, sectional view taken generally along the line 2—2 of FIG. 1.

FIG. 3 is a fragmentary, sectional view taken generally along the line 3—3 of FIG. 2.

FIG. 4 is an enlarged, fragmentary, perspective view showing the manner in which a bent portion of cable to be straightened is disposed on cable support members of the present invention.

DESCRIPTION OF THE PREFERRED EMBODIMENTS

Referring now more particularly to the figures of the drawing, a cable straightener 10 according to the invention includes a base member 12 on which are arranged two laterally spaced, longitudinally extending cable support members 14 and 16 disposed for supporting between them a bent portion 18 of a conventional cable 20, which may be a logging choker and the like.

A lever arrangement 22 is pivotally mounted on base member 12 for moving toward and swinging in a plane intermediate of the cable support members 14 and 16 and selectively engaging bent portion 18 of cable 20 intermediate the associated support members 14 and 16 and straightening bent portion 18. A power device 24 is mounted on base member 12 and connected to lever arrangement 22 for moving lever arrangement 22 relative to the support members 14 and 16.

Base member 12 includes a first mounting surface 26 and a second mounting surface 28 disposed at an obtuse angle with respect to surface 26. Support members 14 and 16 are mounted on the mounting surface 26, while the power device 24, which includes a linear fluid motor 30, is mounted on the mounting surface 28 of base member 12. The lever arrangement 22 extends longitudinally and is mounted on the mounting surface 26 adjacent to and extending longitudinally away from the mounting surface 28, and is connected to motor 30 for being actuated by same.

Lever arrangement 22 is substantially in the form of a bell crank lever having a shorter arm 32 and a longer arm 34 extending at an acute angle from one another. Arm 32 is pivotally mounted on the cable support members 14 and 16 adjacent the mounting surface 28 of base member 12 for swinging movement in a plane parallel to the longitudinal extent of the support members 14 and 16. The arm 34 is pivotally connected to the motor 30 so as to cause the lever arrangement 22 to be pivoted by the motor 30.

Motor 30 includes a piston 38 and cylinder 40 assembled in a conventional manner and including a piston rod 42 affixed to piston 38 and extending from cylinder 40 for pivotal connection to the outer, or free, end of arm 34 as by a conventional pin connection 44. A yoke bracket 46 including a base 48 attached to mounting surface 28 is provided with a pair of substantially parallel, laterally spaced legs 50 and 52 for pivotally mounting cylinder 40 on the support or mounting surface 28 of base member 12. By this arrangement, cylinder 40 will be able to pivot relative to base member 12 and retain a proper relationship with respect to an instantaneous position of the lever arrangement 22. Thus, the pivotal mounting of cylinder 40 cooperates with the by-planar construction of the base member 12 to provide adequate power transfer between the motor 30 and the arm 32 of lever arrangement 22 by a simple and lightweight construction.

Cable support members 14 and 16 are each provided with a pair of recesses 54 and 56 disposed laterally opposite a like recess provided in the other of the members 16, 14 for receiving a cable 20 to be straightened. The bent portion 18 of the cable 20 is disposed between the members 14 and 16, with the arm 32 of the lever arrangement 22 being arranged between the members 14 and 16 as well and provided with a pair of recesses 58 for selectively engaging the corresponding recesses 54 and 56 and, accordingly, a bent portion 18 disposed in such recesses. As will be readily appreciated, only a single pair of recesses need be provided in the support members 14 and 16 and in the arm 32, but a plurality of such recesses being provided on the support members 14 and 16, with the number of such recesses so provided being greater than the two such recesses illustrated, will permit more than one cable, or portion of a length of cable, to be straightened simultaneously.

Power device 24 further includes a conventional graduating valve 60 provided with a suitable actuating handle (not shown) and mounted on the mounting surface 26 at a point thereon spaced from the mounting surface 28 and connected to cylinder 40 as by a conventional hose 62 for controlling displacement of piston 38 within cylinder 40. Valve 60 will be connected to a suitable source (not shown) of air under pressure, such as may be provided on a conventional logging truck schematically represented by the structure designated S supporting the straightener 10 in FIGS. 1 through 3 of the drawing, as by a conventional fitting (not shown) provided on valve 60.

A hook 64 in the form of a length of steel rod, and the like, welded to one of the support members 14 and 16, with 16 being illustrated as being so provided, and bent across the top of the recesses 54 and 56 for facilitating and retaining the cable to be straightened within the associated recesses 54, 56. As will be appreciated, support members 14 and 16 may be constructed from lengths of conventional steel angles, and the like so that one leg of the angle forms the support member itself and the other leg of the angle forms a base of the support member which facilitates attachment of the support member to the associated support surface of the base member 12.

Straightener 10 is advantageously provided with an anvil 66 slidably disposed between the support members 14 and 16 for selectively converting the device from a straightener to a splicing vise. Anvil 66 is formed by a block 68 of steel, and the like, provided with a pair of channels 70 and 72 selectively disposable at the cable straightening station so as to match with the recesses 54 and 56 provided in members 14 and 16. When so arranged, in a manner not illustrated in the drawing, the device can be employed in a known manner as a splicing vise by bringing the arm 32 of lever arrangement 22 down upon a pair of cables disposed in at least one of the channels 70 and 72 and retaining the cables in end abutting relationship until same can be spliced in a conventional manner. Further, when anvil 66 is in the position shown in FIGS. 1 and 2 of the drawing, anvil 66 will not interfere with the use of the device as a cable straightener in the manner described above.

A conventional coiled tension spring 74, and the like, is advantageously connected between the outer end of piston rod 42 and cylinder 40 for causing lever arrangement 22 to return to the position shown in FIGS. 1 and 2 of the drawing. Further, one or more ties 76 are advantageously disposed beneath mounting surface 26 of base member 12 for facilitating attachment of base member 12 to a suitable supporting structure S. The ties 76 may be secured to the base member 12 in a conventional manner, such as by welding.

As can be appreciated from the above description and from the drawing, a choker straightener and splicing vise according to the invention provides a simple and lightweight yet rugged and reliable device for removing bends and kinks from chokers by workmen in the woods. The device may be mounted on a conventional logging truck, and the like, or can be actuated by a suitable fluid source, such as an air pump readily available on loading and yarding machines and other logging equipment on which it is mounted. Further, it can be anchored to a stump or log at the logging site, provided a source of fluid under pressure is available. It has been found that a suitable device may be constructed which weighs less than 150 pounds. The use of a graduating valve for actuating the fluid motor of the device is especially advantageous when the device is used as a splicing vise. The economics of the invention will enable all loggers to be able to afford their own straightener and splicing vise. The impact on safety of workmaen is tremendous. Workmen in the woods can have straight chokers at all times, which eliminates the possibility of bends and kinks from straightening themselves after the choker has been applied to a, for example, log or bundle of logs, and the like, and permitting the log or logs to slip and injure workmen in the vicinity. The average choker can be strightened with the invention in, for example, less than three minutes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new as is follows:

1. A choker straightener, comprising, in combination:
   a. a base member;
   b. two laterally spaced cable support members arranged on the base member for supporting a bent portion of cable between the support members;
   c. lever means pivotally mounted on the base member for movement toward and intermediate of the cable support members and selectively engaging a bent portion of cable intermediate the associated cable support members and straightening the bent portion; and
   d. power means mounted on the base member and connected to the lever means for moving the lever means relative to the cable support members, the base member including a first mounting surface and a second mounting surface disposed at an obtuse angle with respect to the first mounting surface, the cable support members being mounted on the first mounting surface and the power means including a linear fluid motor mounted on the second support surface, with the lever means extending longitudinally and mounted on the first mounting surface adjacent to and extending longitudinally away from the second mounting surface and connected to the fluid motor.

2. A structure as defined in claim 1, wherein the lever means is substantially in the form of a bell crank lever having a longer arm and a shorter arm extending at an acute angle from one another, the longer arm being pivotally mounted to the cable support members adjacent the second mounting surface for swinging movement in a plane parallel to the longitudinal extent of the cable support members, and the shorter arm being pivotally connected to the fluid motor, for movement thereby.

3. A structure as defined in claim 1, wherein the cable support members are each provided with a recess disposed laterally opposite a recess provided in the other of the cable support members for receiving a cable to be straightened, a bent portion of the cable being disposed between the cable support members, and the lever means being arranged between the cable support members and provided with a recess for selectively engaging the bent portion of the cable to be straightened.

4. A structure as defined in claim 1, wherein the fluid motor includes a piston and a cylinder, the piston slidably disposed within the cylinder, a piston rod affixed to the piston and extending from the cylinder and pivotally connected to the shorter arm of the lever means, and yoke means for mounting the cylinder on the second mounting surface, the yoke means including the substantially U-shaped element affixed to the second mounting surface by a base and receiving the cylinder between cooperating upstanding substantially parallel, spaced legs, with the cylinder being pivotally mounted on the upstanding legs so as to pivot relative to the second support surface.

5. A structure as defined in claim 4, wherein the cable support members are each provided with a recess disposed laterally opposite a recess provided in the other of the cable support members for receiving a cable to be straightened, a bent portion of the cable being disposed between the cable support members, and the longer arm of the lever means being arranged between the cable support members and provided with a recess for selectively engaging the bent portion of a cable to be straightened.

6. A structure as defined in claim 1, wherein the poower means further includes a graduating valve mounted on the first mounting surface at a point spaced from the second mounting surface and connected to the cylinder of the fluid motor for controlling displacement of the piston within the cylinder.

7. A structure as defined in claim 6, wherein the combination further includes anvil means slidably disposed between the cable support members for permitting the combination to selectively form a cable splicing vise, the anvil means being provided with a channel matching the recesses provided in the cable support members.

8. A choker straightener, comprising, in combination:
   a. a base member;
   b. two laterally spaced cable support members arranged on the base member for supporting a bent portion of cable between the support members;
   c. lever means pivotally mounted on the base member for movement toward and intermediate of the cable support members and selectively engaging a bent portion of cable intermediate the associated cable support members and straightening the bent portion;
   d. power means mounted on the base member and connected to the lever means for moving the lever means relative to the cable support members; and
   e. anvil means slidably disposed between the cable support members for permitting the combination to selectively form a cable splicing vise, the anvil means being provided with a channel matching the recesses provided in the cable support members.

9. A cable straightener and splicing vise, comprising, in combination:
   a. a base member;
   b. two laterally spaced cable support members arranged on the base member for supporting a bent portion of cable between the support members;
   c. lever means pivotally mounted on the base member for movement toward and intermediate of the cable support members and selectively engaging the bent portion of cable intermediate the associated cable support members and straightening the bent portion of the cable;
   d. power means mounted on the base member and connected to the lever means for moving the lever means relative to the cable support members; and
   e. anvil means slidably disposed between the cable support members for permitting the combination to function as a cable splicing vise.

* * * * *